(12) United States Patent
Ahn et al.

(10) Patent No.: US 8,286,530 B2
(45) Date of Patent: Oct. 16, 2012

(54) BICYCLE HANDLE ASSEMBLY

(75) Inventors: Sung-Hoon Ahn, Seongnam-si (KR); Chung-Soo Kim, Seoul (KR); Min-Jee Roh, Seoul (KR)

(73) Assignee: SNU R&DB Foundation, Seoul (KR)

( * ) Notice: Subject to any disclaimer, the term of this patent is extended or adjusted under 35 U.S.C. 154(b) by 81 days.

(21) Appl. No.: 12/956,073

(22) Filed: Nov. 30, 2010

(65) Prior Publication Data

US 2011/0290067 A1      Dec. 1, 2011

(30) Foreign Application Priority Data

Nov. 30, 2009   (KR) .................. 10-2009-0117122
Nov. 8, 2010    (KR) .................. 10-2010-0110678

(51) Int. Cl.
*B62K 21/12*       (2006.01)
(52) U.S. Cl. ............... 74/551.8; 74/551.19; 482/57
(58) Field of Classification Search ...... 74/551.1–551.9; 482/44–46, 57, 62, 81, 82, 117; 403/122–124, 403/127–129, 131, 132, 136, 138, 144
See application file for complete search history.

(56) References Cited

U.S. PATENT DOCUMENTS

| | | | | |
|---|---|---|---|---|
| 5,297,445 | A | * | 3/1994 | Chen ........................... 74/551.3 |
| 5,443,323 | A | * | 8/1995 | Prelat et al. .................... 403/289 |
| 6,409,413 | B1 | * | 6/2002 | Bieg et al. ..................... 403/115 |

* cited by examiner

*Primary Examiner* — James Pilkington
*Assistant Examiner* — Richard Urbanski
(74) *Attorney, Agent, or Firm* — Brian R. Morrison; Westman, Champlin & Kelly, P.A.

(57) ABSTRACT

A bicycle handle assembly, of which the position of the handle grip can be freely adjusted according to the need of the rider, enabling the rider to ride the bicycle in a comfortable posture. The bicycle handle assembly includes: a stem prepared on a front-wheel fork of a bicycle; a handlebar installed on the stem; a handle grip coupled to either end of the handlebar; a ball joint prepared between the handlebar and the handle grip to enable the handle grip to rotate; and a securing element installed on the ball joint to secure the handle grip in a particular position. The bicycle handle assembly makes it possible to freely adjust the positions of the handle grips according to the need of the rider, thereby distributing the load that may otherwise be concentrated on the wrists and preventing pain and injury.

7 Claims, 6 Drawing Sheets

BICYCLE HANDLE ASSEMBLY

CROSS-REFERENCE TO RELATED APPLICATIONS

The present application claims priority to Korean Patent Application No. 10-2009-0117122, filed on Nov. 30, 2009 and to Korean Patent Application No. 10-2010-0110678, filed on Nov. 8, 2010, the disclosures of which are incorporated by reference in their entireties.

BACKGROUND

1. Technical Field

The present invention relates to a bicycle handle assembly, more particularly to a bicycle handle assembly of which the position of the handle grip can be freely adjusted according to the need of the rider, enabling the rider to ride the bicycle in a comfortable posture.

2. Description of the Related Art

A bicycle is a type of two-wheeled vehicle in which the wheels are rotated by human muscle power. With the increase in attention drawn to low-carbon, green growth, as well as to healthier lifestyles, in recent times, the demand for bicycles is rapidly growing, as a typical environment-friendly means of transportation.

The bicycle is generally composed of a frame, wheels installed at the front and back of the frame, a saddle on which the rider may be seated, a handle assembly for controlling the direction of movement, chain rings for generating rotational power as the rider operates the pedals, and a chain and sprocket set for transferring the rotational power generated in the chain rings to the rear wheel.

Of the components of a bicycle described above, the handle assembly is used both for controlling the direction of movement and for maintaining balance for the bicycle. The handle assembly may be composed of a vertical stem that connects with the frame, a handlebar located on the top end of the stem, and handle grips that are coupled to the end portions of the handlebar.

Typically, the handle assembly is manufactured in consideration of the rider's physical structure. For example, the handlebar may preferably have a form that allows easy control of the direction of movement, while the handle grips may preferably have a form that allows easy gripping.

It is typical for the handle assembly to have the handlebar installed horizontally at the top end of the stem. If the bicycle is used for long periods of time, the horizontally fixed handlebar may result in the load being concentrated on the wrists, causing pain or even injury such cartilage wear. Also, since the riding posture is fixed regardless of the riding conditions, there may be fatigue caused in other parts of the body besides the wrists, such as the back, legs, shoulders, neck, etc.

SUMMARY

To resolve the problems of the related art as described above, an aspect of the invention aims to provide a bicycle handle assembly of which the position of the handle grip can be freely adjusted according to the need of the rider, enabling the rider to ride the bicycle in a comfortable posture.

To achieve the above objective, an aspect of the present invention provides a bicycle handle assembly that includes: a stem prepared on a front-wheel fork of a bicycle; a handlebar installed on the stem; a handle grip coupled to either end of the handlebar; a ball joint prepared between the handlebar and the handle grip to enable the handle grip to rotate; and a securing element installed on the ball joint to secure the handle grip in a particular position.

In a bicycle handle assembly such as that described above, the position of the handle grip can be adjusted freely by way of the ball joint, and the handle grip can be secured in a particular position by way of the securing element.

Thus, an embodiment of the present invention makes it possible to freely adjust the positions of the handle grips according to the need of the rider, thereby distributing the load that may otherwise be concentrated on the wrists and preventing pain and injury. Also, since the rider can assume various postures according to riding conditions, the burden on other parts of the body, such as the back, legs, shoulders, neck, etc., can be reduced.

Additional aspects and advantages of the present invention will be set forth in part in the description which follows, and in part will be obvious from the description, or may be learned by practice of the invention.

DETAILED DESCRIPTION

Figure 1:
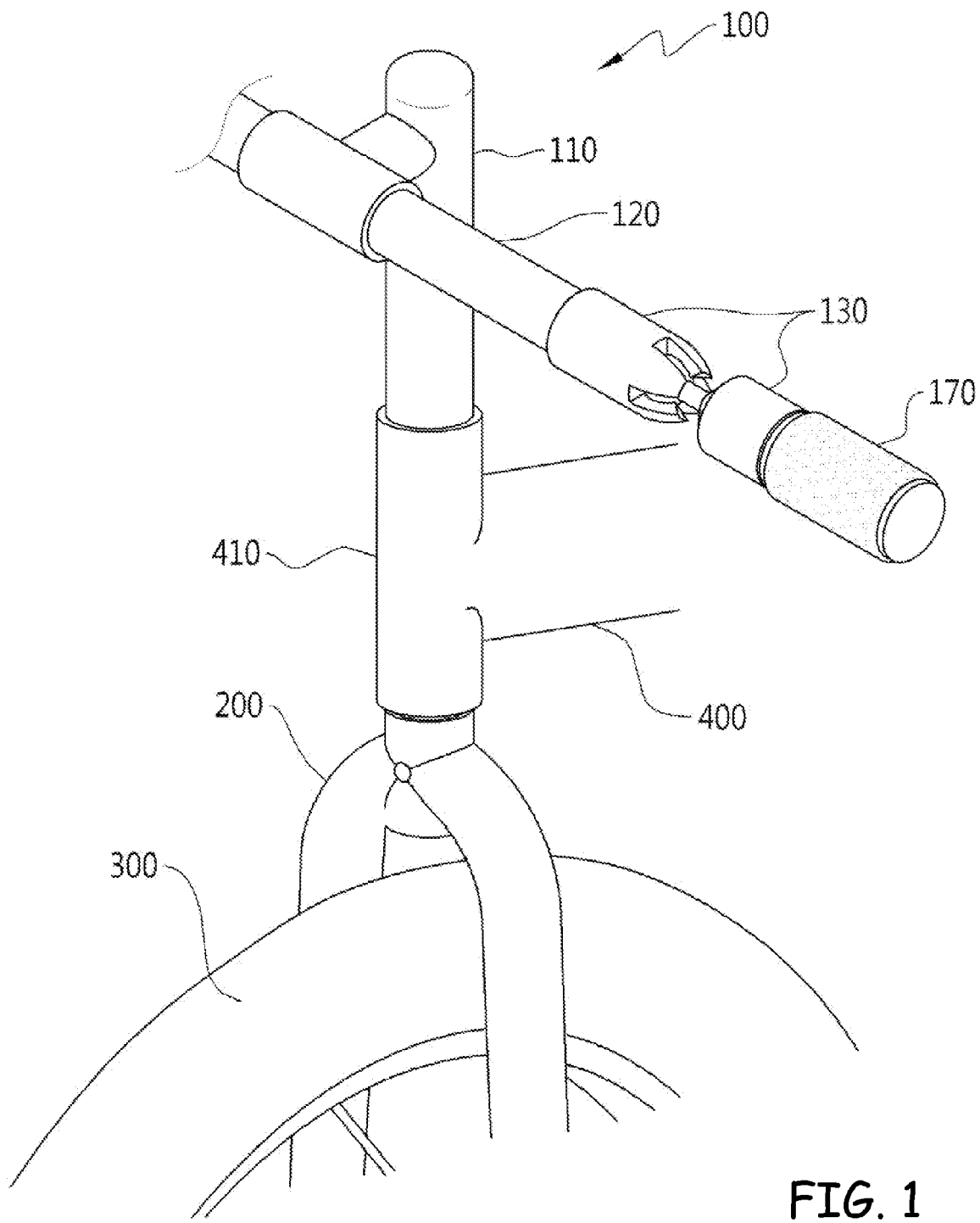
FIG. 1 is a perspective view of a bicycle handle according to an embodiment of the present invention.
Figure 2:
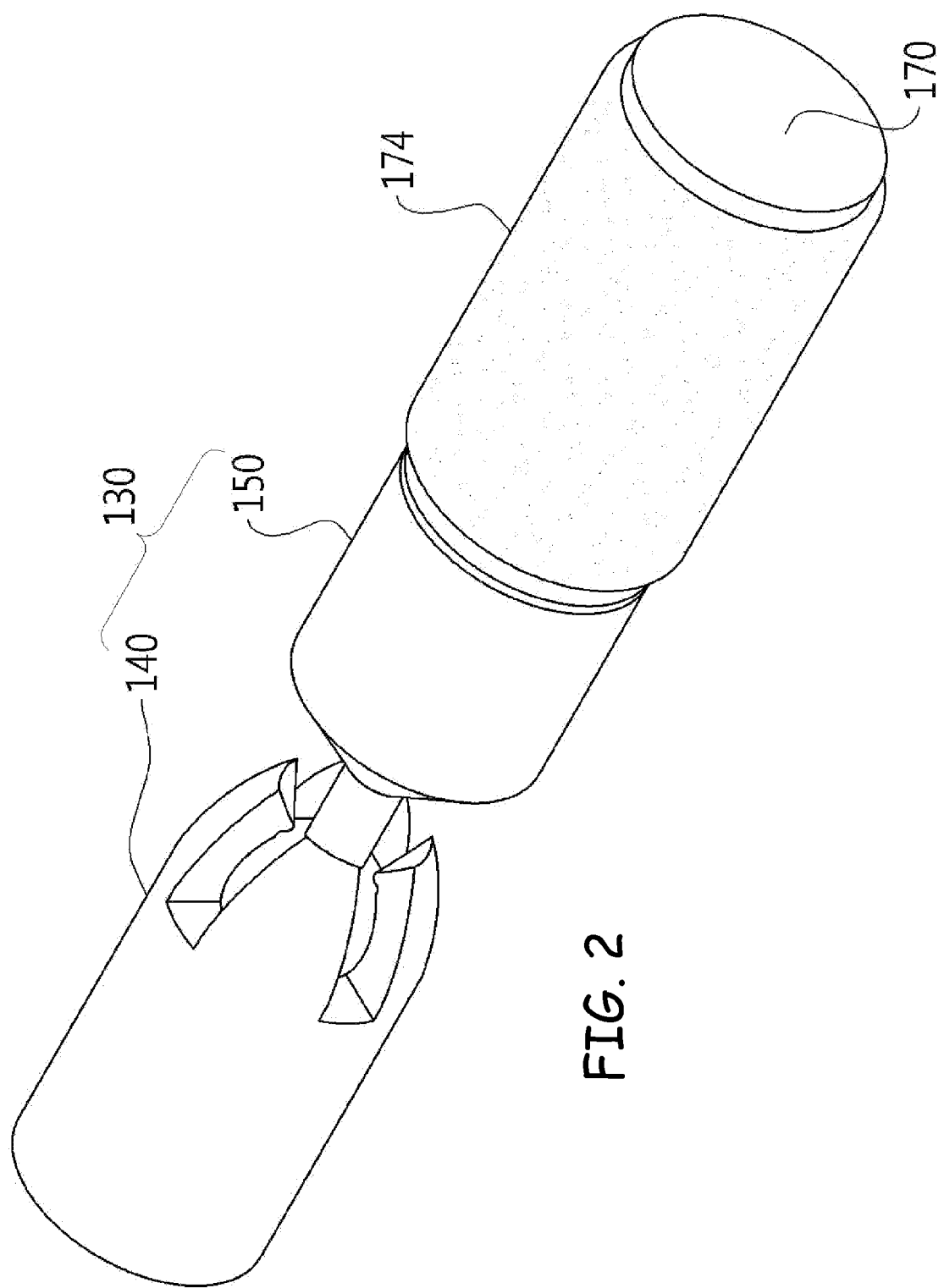
FIG. 2 is a magnified view of a bicycle handle according to an embodiment of the present invention.
Figure 3:
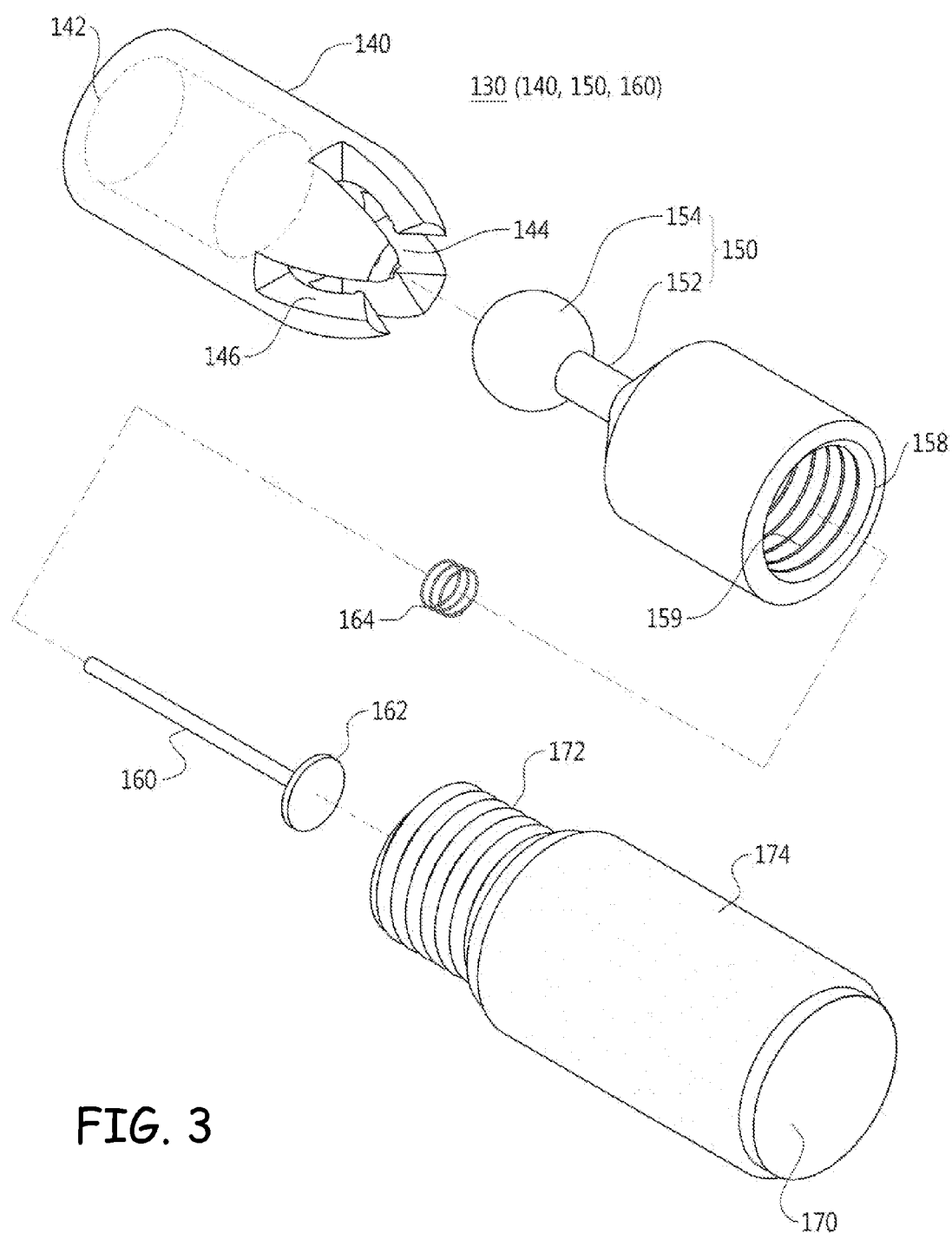
FIG. 3 is an exploded perspective view of a bicycle handle according to an embodiment of the present invention.
Figure 4:
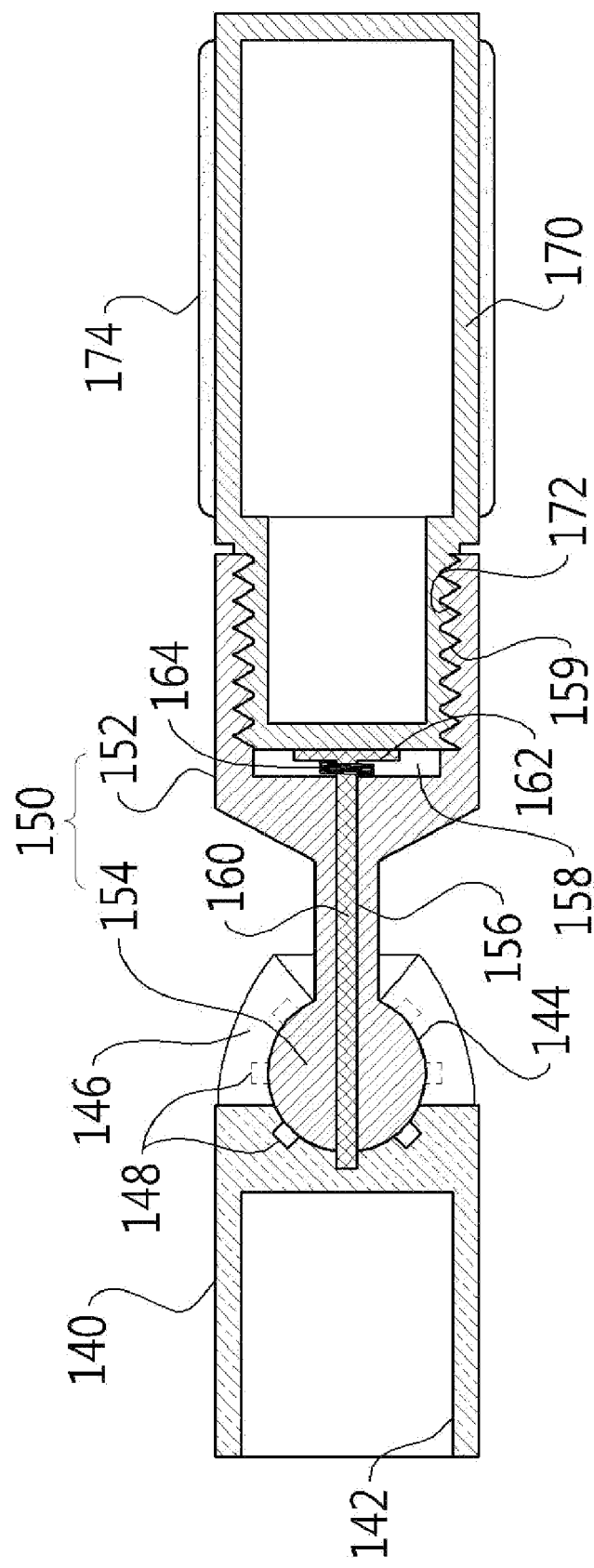
FIG. 4 is a cross-sectional view of a bicycle handle according to an embodiment of the present invention.

An embodiment of the present invention will be described below in more detail with reference to the accompanying drawings. In regard to the descriptions that follow, as well as to the reference numerals rendered to the components shown in the drawings, like numerals refer to like components regardless of the figure number.

Referring to FIG. 1 through FIG. 4, a bicycle handle assembly 100 may include a stem 110 installed on a front-wheel fork 200 of a bicycle, a handlebar 120 prepared on the stem 110, a ball joint 130 installed on an end portion of the handlebar 120, and a handle grip 170 coupled to the ball joint 130.

The stem 110 is the rotational axis that transfers the direction control of the handle assembly 100 to the front wheel 300. The stem 110 may be installed on an upper portion of the front-wheel fork 200 and may be rotatably coupled to the head tube 410 of the frame 400. By way of this structure, the direction control implemented by manipulating the handle assembly 100 may be transferred through the stem 110 to the front-wheel fork 200, and the direction of movement of the bicycle may be adjusted.

The handlebar 120 is the part that a rider manipulates directly in order to control the direction of movement of the bicycle. A middle portion of the handlebar 120 may be secured to an upper portion of the stem 110, while the ball joint 130 may be coupled to either end of the handlebar 120. Preferably, the handlebar 120 may have a light weight, so that the rider can control the direction of movement without much effort. For example, the handlebar 120 can be manufactured in the shape of a pipe made from an aluminum or aluminum alloy material.

The ball joint 130 is a rotating element by which the position of the handle grip 170 can be freely adjusted according to the need of the rider. Looking at its composition, the ball joint 130 may include a ball seat 140, which may be coupled to an end portion of the handlebar 120, a ball stud 150, which may be coupled to the handle grip 170 and of which a portion may be inserted in the ball seat 140, and a securing element 160, which may penetrate through the ball stud 150.

A more detailed description is provided as follows on each component 130-160 of the ball joint 130.

The ball seat 140 may be shaped as a cylindrical rod having a particular length. A coupling cavity 142 may be formed in one end of the ball seat 140 in which to insert the handlebar 120, while a socket cavity 144 may be formed in the other end in which to insert the ball stud 150. Also, slits 146 may be formed radially along the periphery of the other end of the ball seat 140, while securing indentations 148 may be formed in certain intervals within the socket cavity 144. The slits 146 are where the stud 152 of the ball stud 150 may be inserted to allow the handle grip 170 to be bent at a right angle to the handlebar 120. In particular, since the slits 146 may be formed radially along the periphery of the other end of the ball seat 140, the handle grip 170 can be bent in various directions.

The securing indentations 148 are where an end portion of the securing element 160 may be inserted. The securing indentations 148 may be formed in certain intervals in the inner perimeter of the socket cavity 144, so that the handle grip 170, which is able to rotate about the ball joint 130, can be secured in various positions.

The ball stud 150 may be composed of a multi-leveled stud 152 and a ball head 154 formed on the end of the part having the smaller radius. Inside the ball stud 150 having this shape, a through-hole 156 may be formed through which the securing element 160 may be inserted. Also, at one end of the ball stud 150, a fastening cavity 158 may be formed to which the handle grip 170 may be coupled, with a thread 159 formed on the inside of the fastening cavity 158.

The securing element 160 may be shaped as a pin, intended to secure the handle grip 170 at a particular position. A detent 162 may be formed on the end of the securing element 160 that faces the handle grip 170, and a spring 164 may be installed between the detent 162 and the ball stud 150.

The handle grip 170 is the part that the rider holds when using the bicycle. The handle grip 170 may have a thread 172 formed on one end to allow screw-coupling with the ball stud 150. Also, an elastic material 174 can be added to the surface, to allow the rider to hold the handle grip 170 more easily and to prevent slipping.

When using an embodiment of the invention structured as described above, the rider can not only freely adjust the position of the handle grip 170 but also secure the handle grip 170 in a particular position according to the need of the rider.

Figure 5:
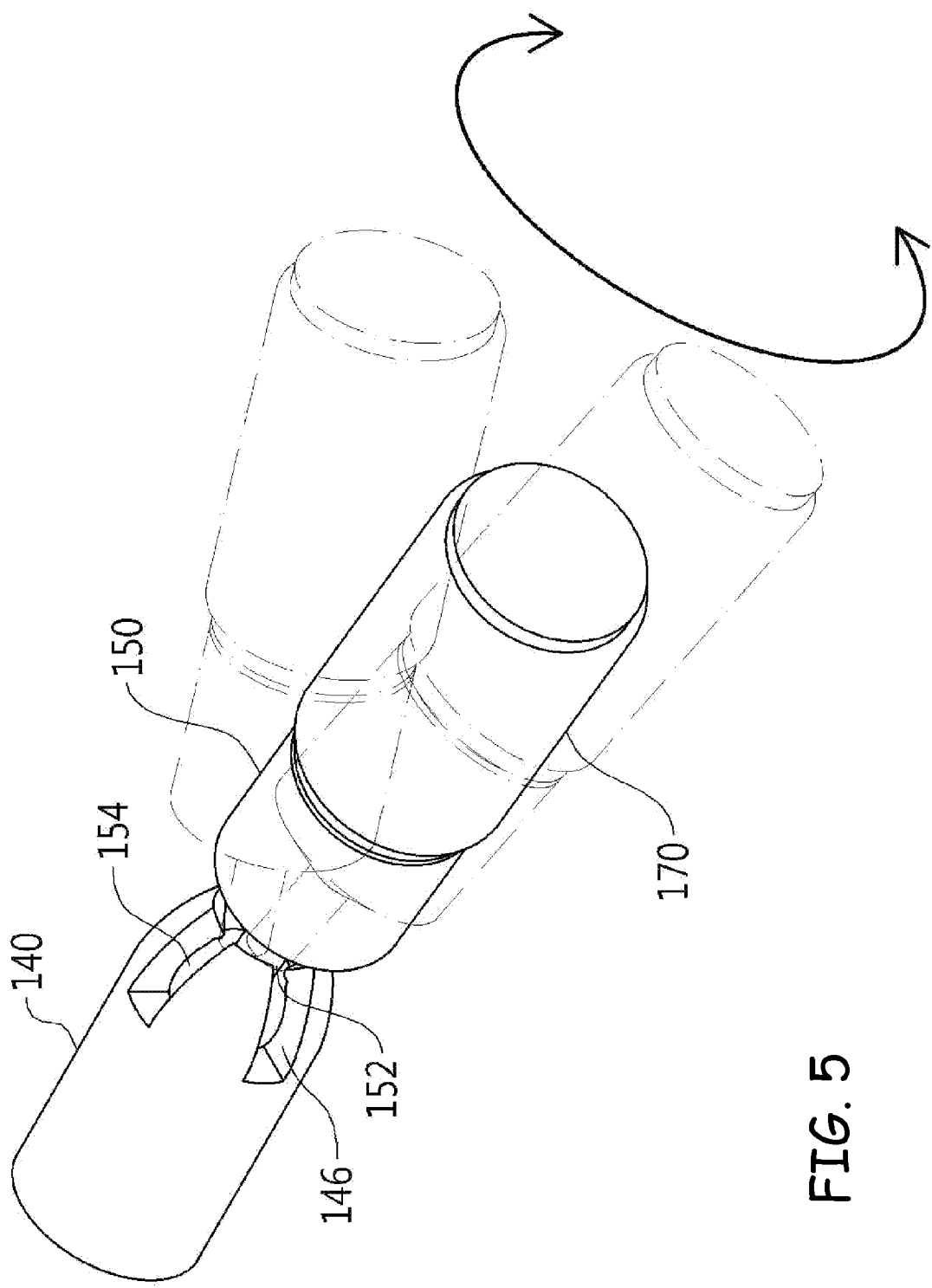
FIG. 5 and FIG. 6 illustrate the operation of a bicycle handle according to an embodiment of the present invention.

For example, by rotating and loosening the handle grip 170, the ball stud 150 and the handle grip 170 can be separated, and the securing element 160 that was pushed by the handle grip 170 may move in the direction of the handle grip 170 because of the spring 164. As the end of the securing element 160 is withdrawn from a securing indentation 148 and the force for securing the ball joint 130 is removed, the handle grip 170 can be rotated freely (see FIG. 4 and FIG. 5).

Conversely, by rotating and tightening the handle grip 170, the space between the ball stud 150 and the handle grip 170 can be narrowed, and the handle grip 170 may push the securing element 160. Thus, the securing element 160 may move in the direction of the handlebar 120, and the end of the securing element 160 may be inserted in a securing indentation 148 to secure the ball joint 130, whereby the handle grip 170 may be secured in a particular position (see FIG. 4 and FIG. 5).

Figure 6:
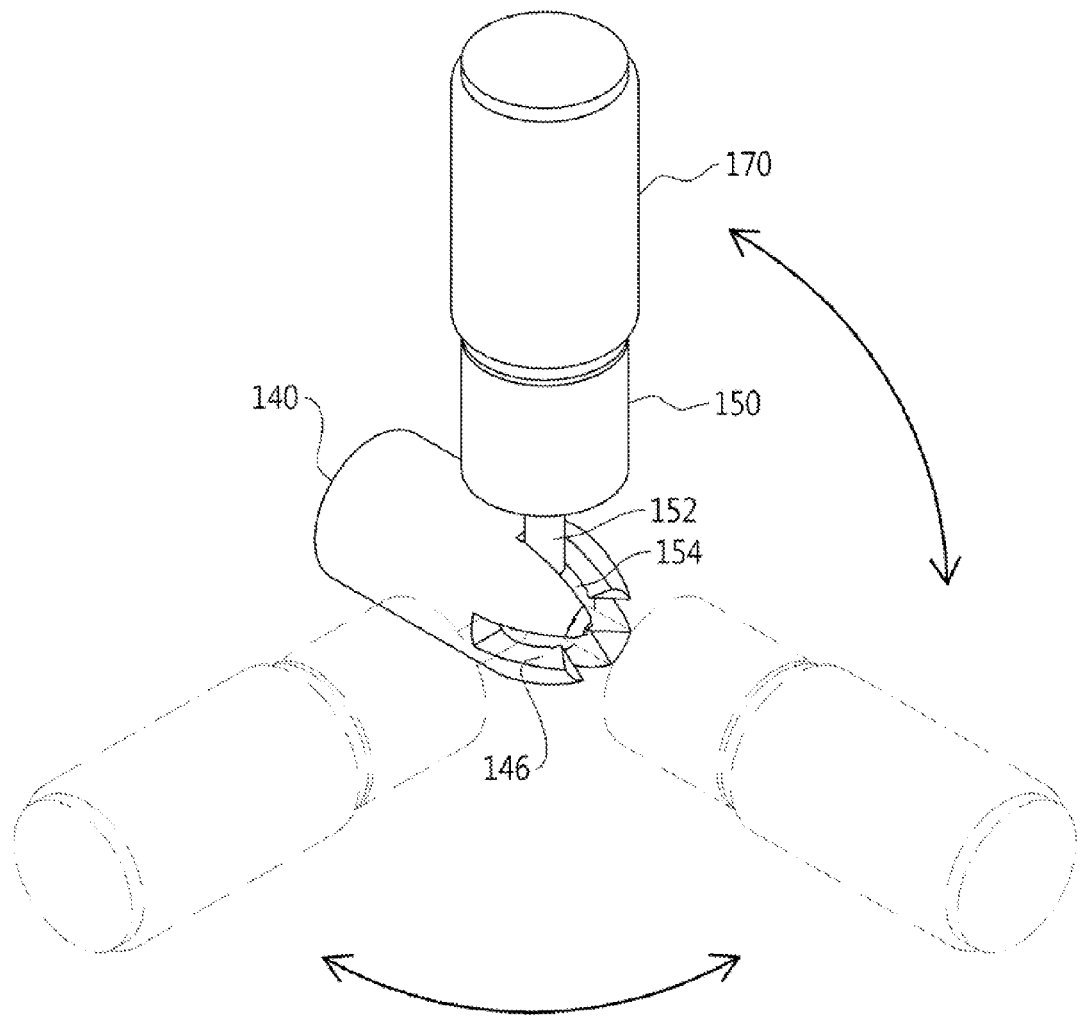

While the handle grip 170 is loosened (while the handle grip is able to rotate freely), the handle grip 170 can be bent at a right angle to the handlebar 120 by rotating the handle grip 170 such that the stud 152 of the ball stud 150 is inserted into a slit 146. Since the slits 146 may be formed radially along the periphery of the other end of the ball seat 140, the handle grip 170 can be bent in various directions (see FIG. 6).

While the present invention has been described above with reference to a preferred embodiment, the above embodiment is intended merely to illustrate the technical spirit of the present invention, and those of ordinary skill in the art will understand that various modifications can be made without departing from the spirit of the invention. As such, the scope of protection of the present invention is to be defined not by any particular embodiment but by the scope of claims appended below and their equivalents.

What is claimed is:

1. A bicycle handle assembly comprising:
a stem prepared on a front-wheel fork of a bicycle;
a handlebar installed on the stem;
a handle grip coupled to either end of the handlebar;
a ball joint prepared between the handlebar and the handle grip to enable the handle grip to rotate, wherein the ball joint comprises:
a ball stud coupled to the handle grip, the ball stud comprising:
a stud formed on one end of the ball stud facing the ball seat; and
a ball head formed on a front end of the stud; and
a ball seat coupled to the handlebar, the ball seat comprising:
a socket cavity formed on one end thereof facing the ball stud, the socket cavity being configured to receive the ball head inserted therein; and
a securing element installed on the ball joint to secure the handle grip in a particular position, wherein the securing element is shaped as a pin penetrating and coupling with the ball stud, and wherein the securing element is configured to secure a rotation of the handle grip by having one end thereof protrude out of the ball head and contact an inner wall of the socket cavity;
wherein the socket cavity includes a plurality of securing indentations formed separated from one another along in an inner wall of the socket cavity, each of the plurality of securing indentations being configured to receive the one end of the securing element inserted therein.

2. The bicycle handle assembly of claim 1, wherein the socket cavity includes a slit formed in a periphery thereof, the slit configured to receive the stud inserted therein.

3. The bicycle handle assembly of claim 2, wherein a plurality of slits are arranged radially along a periphery of the socket cavity.

4. The bicycle handle assembly of claim 1, wherein the ball stud and the handle grip are screw-coupled with each other.

5. The bicycle handle assembly of claim 4, wherein the ball stud has a fastening cavity formed in one end thereof, the fastening cavity configured to receive the handle grip inserted therein, and wherein a female thread is formed in an inner wall of the fastening cavity, and a male thread is formed on one end of the handle grip.

6. The bicycle handle assembly of claim 5, wherein the securing element is coupled such that the securing element is movable within the ball stud, the other end of the securing element protrudes to an inside of the fastening cavity to contact the handle grip, and the securing element is configured to move towards the handlebar or the handle grip when the handle grip is rotated.

7. The bicycle handle assembly of claim 6, wherein the securing element has a detent formed on the other end thereof, a spring is installed between the ball stud and the detent of the securing element, and the securing element is elastically supported towards the handle grip by the spring.

* * * * *